(12) United States Patent
Hosomizo

(10) Patent No.: US 12,153,834 B2
(45) Date of Patent: Nov. 26, 2024

(54) NON-TRANSITORY STORAGE MEDIUM STORING SUPPORTING PROGRAM FOR PRINTING PROGRAM OF OPERATION SYSTEM EXECUTABLE BY COMPUTER OF INFORMATION PROCESSING APPARATUS

(71) Applicant: Brother Kogyo Kabushiki Kaisha, Nagoya (JP)

(72) Inventor: Yoshito Hosomizo, Kitanagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/157,214

(22) Filed: Jan. 20, 2023

(65) Prior Publication Data

US 2023/0236773 A1    Jul. 27, 2023

(30) Foreign Application Priority Data

Jan. 25, 2022  (JP) .................................. 2022-009570

(51) Int. Cl.
  *G06F 3/12*   (2006.01)
  *H04N 1/00*   (2006.01)
  *H04N 1/32*   (2006.01)

(52) U.S. Cl.
  CPC ............ *G06F 3/1204* (2013.01); *G06F 3/123* (2013.01); *G06F 3/1254* (2013.01); *H04N 1/00482* (2013.01); *H04N 1/32122* (2013.01)

(58) Field of Classification Search
  CPC ...... G06F 3/1204; G06F 3/123; G06F 3/1254; G06F 3/1205; G06F 3/1207; G06F 3/1253; G06F 3/1285; G06F 3/1288; H04N 1/00482; H04N 1/32122
  USPC ......................................... 358/1.15
  See application file for complete search history.

(56) References Cited

U.S. PATENT DOCUMENTS

| 2017/0223210 | A1  | 8/2017  | Yamada |
| 2020/0249882 | A1* | 8/2020  | Yamada .................. G06F 3/1244 |
| 2020/0249890 | A1* | 8/2020  | Kakitsuba ............. G06F 3/1259 |
| 2020/0252523 | A1* | 8/2020  | Yamada ............. H04N 1/32144 |
| 2020/0310717 | A1* | 10/2020 | Yamada ................ G06F 3/1256 |

FOREIGN PATENT DOCUMENTS

| JP | 2017-134718 A | 8/2017 |
| JP | 2020-126316 A | 8/2020 |

* cited by examiner

*Primary Examiner* — Kent Yip
(74) *Attorney, Agent, or Firm* — Scully, Scott, Murphy & Presser, P.C.

(57) ABSTRACT

A non-transitory storage medium stores a supporting program executable by a computer of an information processing apparatus. The supporting program, when executed by the computer, causes the information processing apparatus to execute, when being requested from the printing program of an operating system for processing in response to a change of a print setting, obtaining the print setting, generating, based on the obtained print setting, notification data including a notifying image indicating a configurational image of a printed object, and displaying the notifying image on the print setting screen displayed on a display of the information processing apparatus by outputting the generated notification data to the printing program of the operating system.

12 Claims, 12 Drawing Sheets

FIG.2
| PARAMETER | NOTIFYING IMAGE |
|---|---|
| PAGE-LAYOUT PRINTING (2 in 1) | 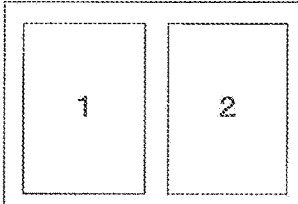 201 |
| PAGE-LAYOUT PRINTING (4 in 1) | 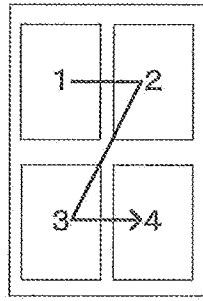 202 |
| BOOKLET PRINTING | 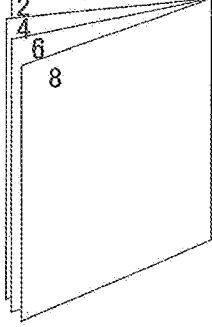 203 |
| POSTER PRINTING (1 in 2 X 2) | 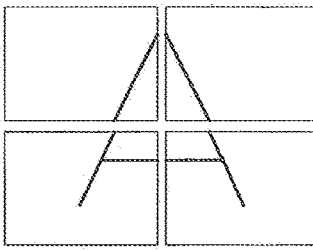 204 |
| STAPLING (UPPER-LEFT) | 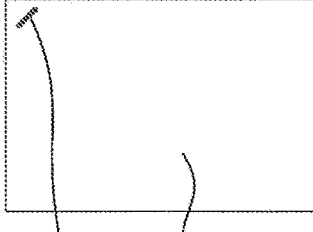 205, 205b, 205a |

FIG.7

| | DETAILED SETTING SCREEN | D3 |

- NUMBER OF COPIES: 1 COPIES
- PAPER ORIENTATION: PORTRAIT
- PRINT QUALITY: FINE
- COLOR MODE: COLOR
- SHEET SIZE: A4 SIZE
- SUPPLY STRAY: AUTOMATIC SELECTION
- PAPER TYPE: PLAIN PAPER
- DUPLEX PRINTING: SIMPLEX PRINTING
- LAYOUT PRINTING: ● OFF ○ ON [DETAILS]
- BORDERLESS PRINTING: ● OFF ○ ON  MARGIN: DEFAULT
- POSTER PRINTING: ● OFF ○ ON [DETAILS]
- BOOKLET PRINTING: ● OFF ○ ON [DETAILS]
- STAPLING: ● OFF ○ ON [DETAILS]

(PRINT) (CANCEL) (APPLY) — SW22

{ 61

NON-TRANSITORY STORAGE MEDIUM STORING SUPPORTING PROGRAM FOR PRINTING PROGRAM OF OPERATION SYSTEM EXECUTABLE BY COMPUTER OF INFORMATION PROCESSING APPARATUS

REFERENCE TO RELATED APPLICATIONS

This application claims priority from Japanese Patent Application No. 2022-009570 filed on Jan. 25, 2022. The entire content of the priority application is incorporated herein by reference.

BACKGROUND ART

The following disclosure relates to a non-transitory storage medium storing a supporting program that supports a control of a printer.

There has been known a conventional configuration, as a technique of controlling a printer by an information processing apparatus such as a PC, in which a printer driver is installed on the information processing apparatus, print data is generated by the printer driver, and the generated print data is transmitted to the printer. The printer driver is provided from a manufacturer of the printer, and the printer driver conforms to various kinds of functions of the printer. Accordingly, a user of the printer can make full use of the printer's potential sufficiently by using the various kinds of functions.

DESCRIPTION

A technique in which a general-purpose printing program installed in a standard operating system, which is the OS that comes standard with the general-purpose printing program, controls the external printer without using the above described printer driver, has been commercialized recently. In this technique, when the OS detects the external printer, the OS establishes an association between the general-purpose printing program installed in the OS and the external printer. After that, in a case where an instruction for a print execution to the external printer is received, printing by the general-purpose printing program installed in the OS becomes available without using the printer driver.

In an information processing apparatus using the general-purpose printing program installed in the OS, however, a technique in which information related to a configuration image of a printed object is displayed before the print execution has not been known. As a result, in a case where print settings are set in contrast to the user's intention, the user instructs the print execution without noticing it. Accordingly, there is still room for improvement.

An aspect of the disclosure relates to a non-transitory storage medium storing a supporting program capable of avoiding an unintended printing result.

In one aspect of the disclosure, a non-transitory storage medium stores a supporting program executable by a computer of an information processing apparatus. The supporting program is configured to support a printing program of an operating system of the information processing apparatus. The supporting program conforms to an external device connected to the information processing apparatus. The printing program of the operating system is configured to process data so as to display a print setting screen on a display of the information processing apparatus. The supporting program, when executed by the computer, causes the information processing apparatus to execute, when being requested from the printing program of the operating system for processing in response to a change of a print setting, obtaining the print setting, generating, based on the obtained print setting, notification data including a notifying image indicating a configurational image of a printed object, and displaying the notifying image on the print setting screen displayed on the display of the information processing apparatus by outputting the generated notification data to the printing program of the operating system.

The objects, features, advantages, and technical and industrial significance of the present disclosure will be better understood by reading the following detailed description of the embodiments, when considered in connection with the accompanying drawings, in which:

FIG. 2 is a view illustrating an example of a management table;

FIG. 7 is a view illustrating an example of a detailed setting screen;

There will be described in details below a personal computer 1, which may be hereinafter referred to as the PC 1, using a supporting program of the present embodiment, with reference to the drawings. The present disclosure discloses the supporting program executed in the PC 1.

Figure 1:
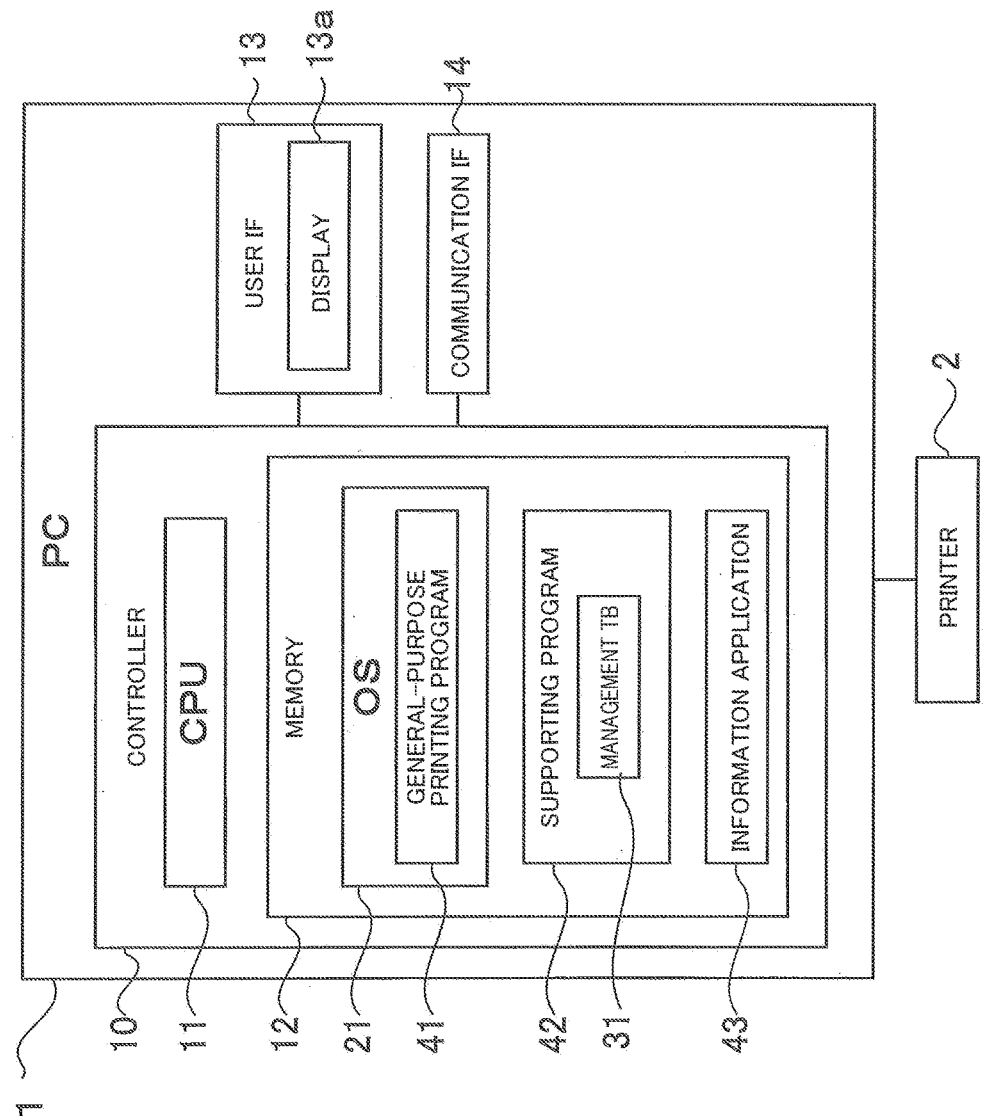
FIG. 1 is a block diagram illustrating an outline of an electric configuration of a PC.

As illustrated in FIG. 1, the PC 1 of the present embodiment includes a controller 10 having a CPU 11 and a memory 12. The PC 1 is an example of an information processing apparatus. The CPU 11 is an example of a computer. Moreover, the PC 1 includes a user interface 13, which may be hereinafter referred to as the user IF 13, and a communication interface 14, which may be hereinafter referred to as the communication IF 14. The user IF 13 and the communication IF 14 are electrically connected to the controller 10. It is noted that the controller 10 in FIG. 1 is a general term for hardware and software used in a control of the PC 1, and the controller 10 is not limited to a single piece of hardware actually existing in the PC 1.

The CPU 11 executes various kinds of processes in accordance with various kinds of programs read from the memory 12 or based on operations by a user. The various kinds of programs and various kinds of data are stored in the memory 12. The memory 12 is also used as a work area at which the various kinds of processes are executed. A buffer in the CPU 11 is also an example of a memory. It is noted that the example of the memory 12 is not limited to a ROM, a RAM, a HDD and so on each built into the PC 1, and the example of the memory 12 may be a storage medium readable and writable by the CPU 11 such as a CD-ROM, a DVD-ROM.

The user IF 13 includes hardware that displays a screen for notifying information to the user and hardware that receives operations by the user. It is noted that the user IF 13 may be a combination of a display 13a capable of displaying information and a mouse, a keyboard and so on each having a function of receiving an input. The user IF 13 may be a touch panel having the display 13a and a function of receiving an input. The user IF 13 includes an example of a display.

The communication IF 14 includes hardware configured to communicate with an external device such as a printer 2. Communication standard of the communication IF 14 includes Ethernet, Wi-Fi, USB and so on. Each of Ethernet, Wi-Fi, USB is a registered trademark. The PC 1 may be connectable to the Internet via the communication IF 14. Moreover, the PC 1 may include a plurality of communication IFs 14 respectively conforming to a plurality of kinds of the communication standard.

As illustrated in FIG. 1, an operating system 21 including a general-purpose printing program 41, a supporting program 42 and various kinds of application programs, which may be hereinafter referred to as the application, are stored in the memory 12 of the PC 1. The operating system 21 may be hereinafter referred to as the OS 21. The OS 21 is, for example, Windows, macOS, Linux, iOS or Android. Each of Windows, macOS, Linux, iOS and Android is a registered trademark. The general-purpose printing program 41 is an example of a printing program. The supporting program 42 is an example of a supporting program.

As various kinds of applications, for example, an information application 43 is installed on the PC 1 of the present embodiment. The information application 43 is, for example, a map application, a calendar application, or a browser application. The information application 43 has a function of causing the PC to display various kinds of information on the display 13a in accordance with requests from the user. The information application 43 is an example of an application program. It is noted that the information application 43 itself may not include a function of causing the printer 2 to print the displayed information.

The general-purpose printing program 41 is a standard program of the OS 21 provided together with the OS 21, and the general-purpose printing program 41 has a function of causing the printer 2 and so on to print information which is displayed on the display 13a by the information application 43 and so on. The general-purpose printing program 41 of the present embodiment is a program having a function of generating intermediate image data based on image data of an image to be printed. The general-purpose printing program 41 supports functions commonly available for various kinds of models of printers supplied by various vendors. Different from a specific printer driver of each of the various kinds of models of the printers, the general-purpose printing program 41 does not support all of inherent functions of each of the various kinds of models of printers, and the general-purpose printing program 41 only supports general-purpose functions of each of the various kinds of models of the printers.

The supporting program 42 is a program or a program group configured to execute processes based on an instruction from the OS 21, and the execution by the supporting program 42 is accompanied by execution of processes by the general-purpose printing program 41. The supporting program 42 is a program configured to support a control of hardware which is to be controlled. The supporting program 42 of the present embodiment conforms to the model of the printer 2 connected to the PC 1, and, for example, the supporting program 42 is activated by the general-purpose printing program 41 in response to receipt of an instruction for causing the printer 2 to print by using the general-purpose printing program 41. The supporting program 42 is called as a print supporting application, the abbreviated name of which is PSA, or a hardware supporting application, the abbreviated name of which is HSA, for example.

It is noted that the supporting program 42 may be a combination of a plurality of programs each receiving an execution order, and the supporting program 42 may be a single program capable of executing different processes in accordance with different orders. Moreover, the supporting program 42 may be a program provided for each of various types of the printers by the vendor of each of the printers. For example, each of a supporting program for an ink-jet printer and a supporting program for a laser printer may be provided. The supporting program is not limited to be provided for each of the various types of the printer, that is, a supporting program may be provided for each of the various kinds of models of the printers or may be provided for each of a plurality of series of the various kinds of models of the printers.

For example, in a case where a new printer is connected to the PC 1, the OS 21 of the PC 1 can download a proper supporting program from a server and so on and install the downloaded supporting program on the PC 1 in accordance with a type and a model of the connected printer. The OS 21 associates identification information of the installed supporting program 42 with information of the newly connected printer and stores the associated identification information into the memory 12.

As illustrated in FIG. 1, the PC 1 of the present embodiment is connected to the printer 2. The printer 2 is a device having at least a print function and a communication function. The printer 2 receives print data and print settings from the external device such as the PC 1, and executes printing in accordance with the received print settings. Examples of setting items of the print settings includes a number of copies, an orientation of printing, printing quality, a size of the sheet, selection of the sheet tray, selection of a kind of the sheet, double-sided printing, color printing, and borderless printing.

In addition to the above described setting items, the setting item of the print setting includes a setting of a processing option in which an object to be printed is processed. The processing option includes, for example, page-integrating printing, page-dividing printing and enlarging-or-reducing printing. The page-integrating printing is a printing method in which a size of each of a plurality of images of N number of pages is reduced and the reduced images are arranged in one printing sheet N. N is the plural number. Examples of the page-integrated printing are page-layout printing (N in 1) and booklet printing. The plurality of images of N number of pages are arranged in the one printing sheet in the order of pages in the page-layout printing. In the booklet printing, the plurality of images of N number of pages which are arranged in a different order of the pages are printed on a front side and a back side of each of printing sheets such that the plurality of pages are arranged in the order of the pages when the printing sheets are folded like a booklet. The page-dividing printing is a printing method in which an image in one page is divided into M number of images and the M number of images are printed on M number of printing sheets. M is the plural number. An example of the page-dividing printing is a poster printing in which a plurality of divided images are respectively printed on a plurality of printing sheets with margins on which the printed plurality of printing sheets are pasted. The enlarging-or-reducing printing is a printing method in which an image of one page is printed so as to be enlarged or reduced at a designated scaling factor.

The setting item of the print setting may further include post-processing in which the printer 2 processes processing with respect to the printed object. The post-processing includes, for example, stapling in which the printed objects are stapled with a staple.

The printer 2 can receive various kinds of the print settings based on functions of the printer 2. The supporting program 42 can receive the print setting via a print setting screen solely dedicated to the printer 2, which may be hereinafter referred to as a detailed setting screen. In the detailed setting screen, the same print setting as the printer 2 receives can be received. In the detailed setting screen, a print setting which cannot be set to the printer 2 may be received. For example, in the detailed setting screen, the supporting program 42 may perform the processing option and receive the processing option via the detailed setting screen in a case where the printer 2 does not perform the processing option.

The supporting program 42 includes a management table 31, which may be hereinafter referred to as a management TB 31. For example, as illustrated in FIG. 2, a plurality of notifying images are stored in the management TB 31 in a state in which the plurality of notifying images are respectively associated with a plurality of parameters of the print settings. That is, the plurality of notifying images are stored in the supporting program 42 in advance. The notifying image 42 is an image indicating a configuration image of the printed object generated in accordance with the print setting. Different from the preview image, the configuration image of the notifying image does not include an image of the content, that is, an image of the object to be printed.

The plurality of notifying images of the plurality of parameters which can be set by the supporting program 42 are stored in the management TB 31. Accordingly, the plurality of notifying images stored in the management TB 31 include the notifying image indicating the configuration image of the processing option which cannot be processed by the printer 2, and include the notifying image indicating the configuration image of a function which are not applicable to the general-purpose printing program 41.

The parameter of the print setting corresponding to the notifying image is, for example, a parameter by which a result of processing can be displayed as an image. The parameter is, for example, the page-layout printing, the booklet printing, the poster printing or the stapling.

For example, as illustrated in FIG. 2, "the page-layout printing (2 in 1)" is associated with a notifying image 201 and the associated notifying image 201 is stored. The notifying image 201 indicates a configuration in which documents of two pages are arranged in one printing sheet. The notifying image 201 includes numerals which indicate an order of pages.

"The page-layout printing (4 in 1)" is associated with a notifying image 202 and the associated notifying image 202 is stored. The notifying image 202 indicates a configuration in which documents of four pages are arranged in one printing sheet. The notifying image 202 includes numerals and an arrow which indicate an order of pages.

"The booklet printing" is associated with a notifying image 203 and the associated notifying image 203 is stored. The notifying image 203 indicates a configuration in which an order of documents are changed such that the documents are arranged in an original order when the documents are arranged and printed on front sides and rear sides of two printing sheets and the printed object of two printing sheets is folded like the booklet.

"The poster printing (1 in 2×2)" is associated with a notifying image 204 and the associated notifying image 204 is stored. The notifying image 204 indicates a configuration in which an image is divided into two in a vertical direction and two in a horizontal direction, and each of the divided images is arranged in and printed on a corresponding one of four printing sheets. The notifying image 204 indicates a layout of the four printing sheet and divided positions of the image by the arrangement of the divided images. The notifying image 204 may include information indicating a printing order of the images.

"The stapling (upper-left)" is associated with a notifying image 205 and the associated notifying image 205 is stored. The indication of the stapling is illustrated at an upper left of the notifying image 205. The notifying image 205 includes an image 205a indicating a printing sheet and an image 205b indicating a staple at an upper left of the image 205a. The notifying image 205 indicates a configuration in which the printing sheets are stapled at the upper left of the printing sheets with the staple.

The general-purpose printing program 41 receives the print settings corresponding to functions supported by the printing program 41 via the print setting screen. Moreover, the general-purpose printing program 41 has a function of causing the display 13a to display information, received from the supporting program 42, on the print setting screen. The information which can be displayed on the print setting screen includes, for example, items or parameters of the print settings and the plurality of notifying images.

There will be described next a sequence of steps of printing including operations of the supporting program 42 in the present embodiment and the sequence of steps of each of the programs in a case where printing is selected in the information application 43 with reference to a sequence illustrated in FIG. 3. It is noted that, in the sequence illustrated in FIG. 3 and other sequences which will be described below, the operations of the programs are explained in a case where the supporting program 42 conforming to the printer 2 is installed on the PC 1.

It is noted that each of steps of processes and steps in the flowcharts in the present embodiment basically indicates processes performed by the CPU 11 in accordance with orders described in the programs such as the supporting program 42. The processes performed by the CPU 11 include a hardware control using an API of the OS 21. In the present disclosure, there will be described operations of each of the programs, and a detailed explanation of the OS 21 is dispensed with. Moreover, "obtainment" is used as a concept not requiring a request.

Figure 4:
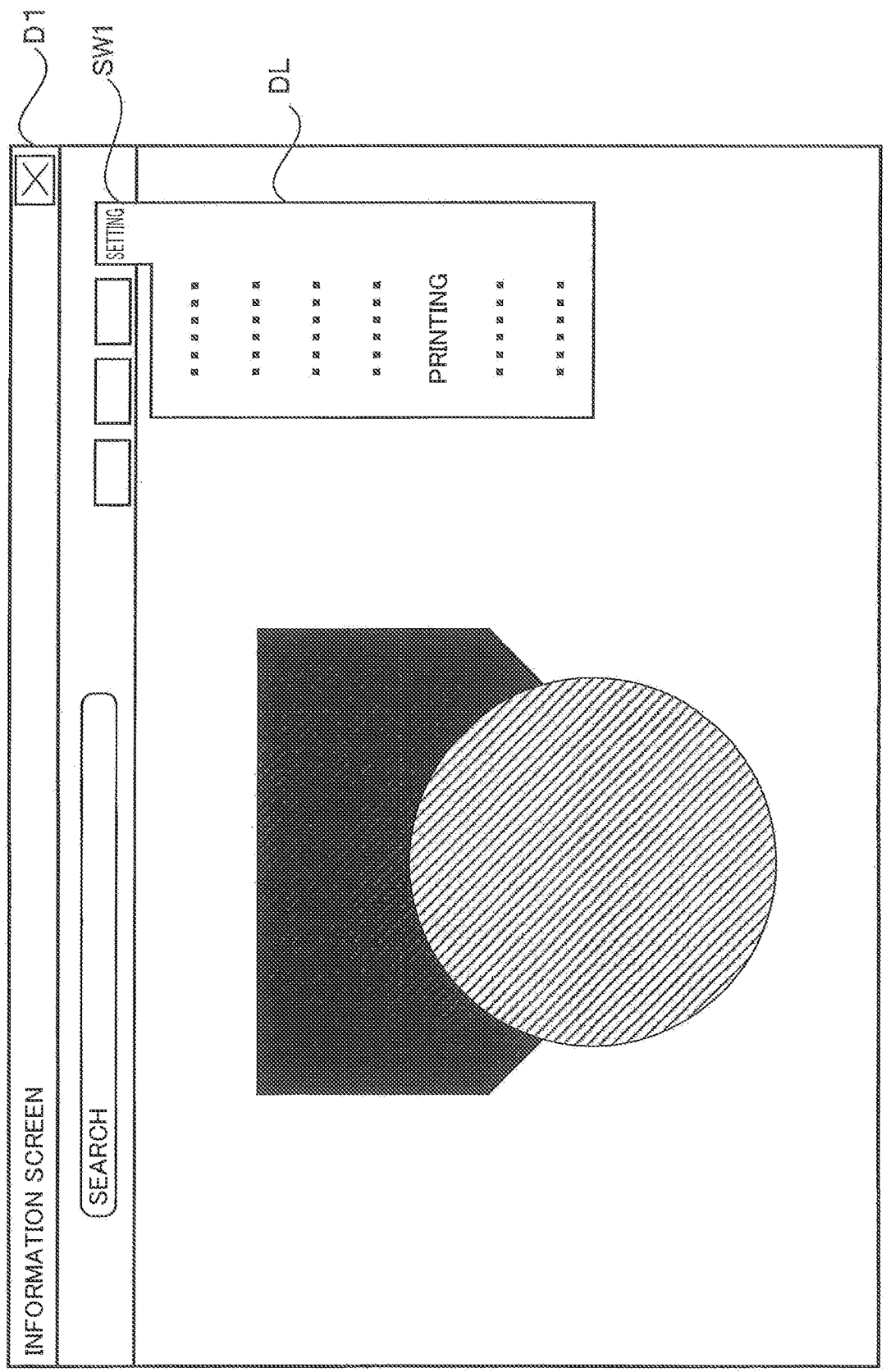
FIG. 4 is a view illustrating an example of an information screen.

At the beginning of the steps, the user activates the information application 43 at A01. At A02, the information application 43 causes the PC 1 to display an information screen including various kinds of information on the display 13a in accordance with an instruction from the user. In a case where the user wishes to print an image of the information screen which is being displayed, the user selects printing on the information screen at A03. As illustrated in FIG. 4, for example, an information screen D1 includes a setting button SW1. When the setting button SW1 is pushed by the operation of the user, a pull-down menu DL including "printing" is displayed, as illustrated in FIG. 4. When "printing" in the pull-down menu DL is selected by the user, the information application 43 transmits a display request and data of the information screen to the general-purpose printing program 41 of the OS 21 at A04.

Figure 5:
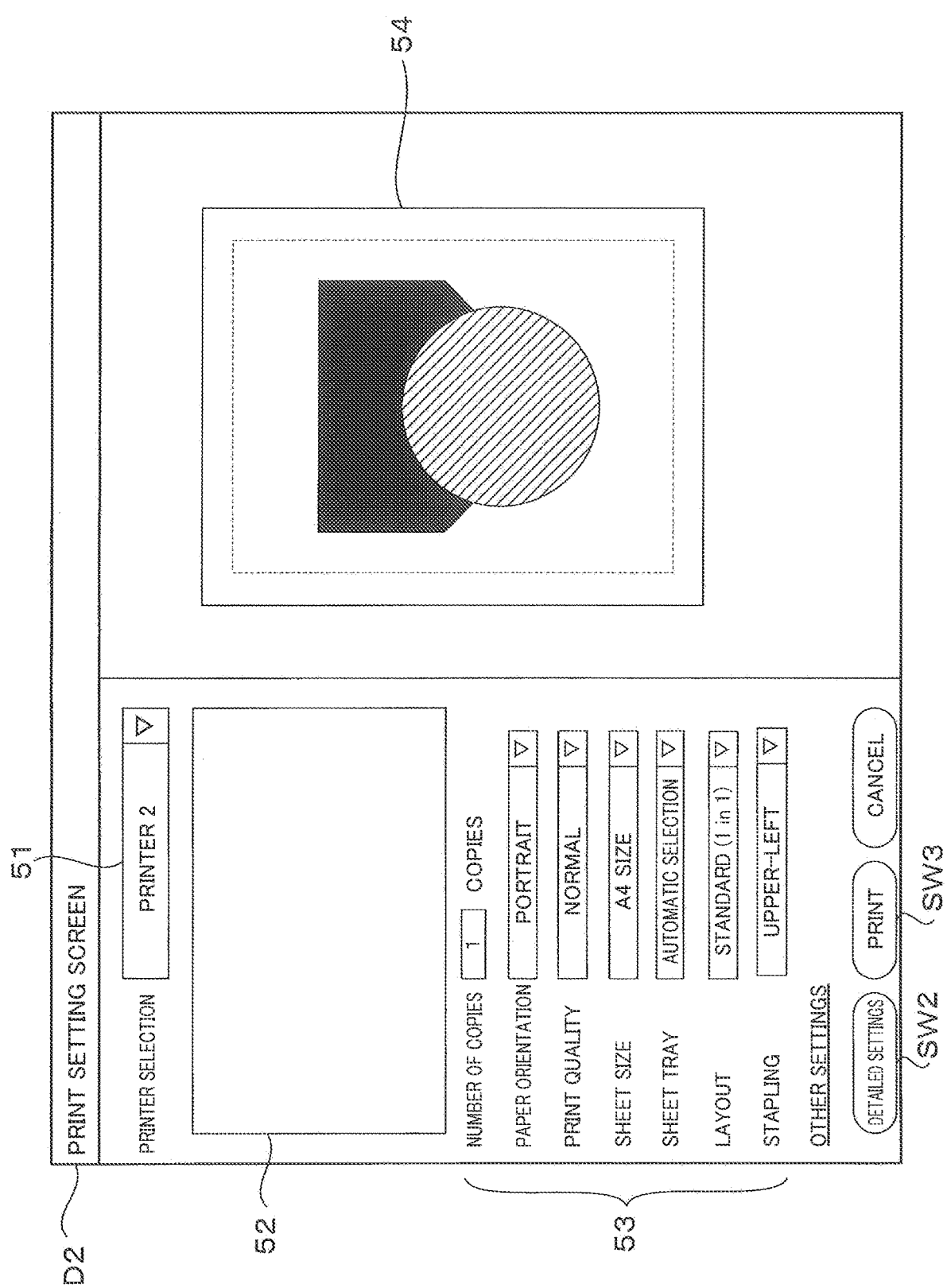
FIG. 5 is a view illustrating an example of a print setting screen.

The general-purpose printing program 41 causes the PC 1 to display a print setting screen on the display 13a in accordance with the transmission of the transmitted display request at A06. The print setting screen is a screen configured to receive the instruction for setting the print setting and an instruction for a print execution. As illustrated in FIG. 5, for example, the print-setting screen D2 includes a printer selecting column 51 that receives a selection of the printer, a notifying area 52 that displays a notifying image, a print setting column 53 that receives various kinds of designations of the print settings, a preview area 54 that illustrates an image of the information screen which is to be printed, a detailed setting button SW2 that receives an instruction for setting detailed print settings, and a printing button SW3 that receives the instruction for receiving the print execution.

In the print setting column 53, a parameter setting can be received in a state in which the print setting is displayed on the print setting column 53 by the general-purpose printing program 41. Examples of items which can be set via the print setting column 53 includes a number of copies, an orientation of printing, printing quality (resolution), lay-out, stapling, a printing area, kind of printing sheet, color printing, borderless printing, and enlarging-or-reducing printing. For example, "standard (1 in 1)" in which a change of one page is disposed at unity magnification, "page-layout printing (2 in 1)" and "page-layout printing (4 in 1)" can be selected in the list box of the layout. To make the print setting easy, only main items may be displayed on the print setting column 53 and other items may be displayed when an operation related to the other setting is received. The print setting column 53 may be displayed so as to include items solely dedicated to the printer 2.

The notifying image displayed on the notifying area 52 is an image indicating a notification to be notified to a user. The general-purpose printing program 41 can process data for displaying the print-setting screen D2.

Figure 3:
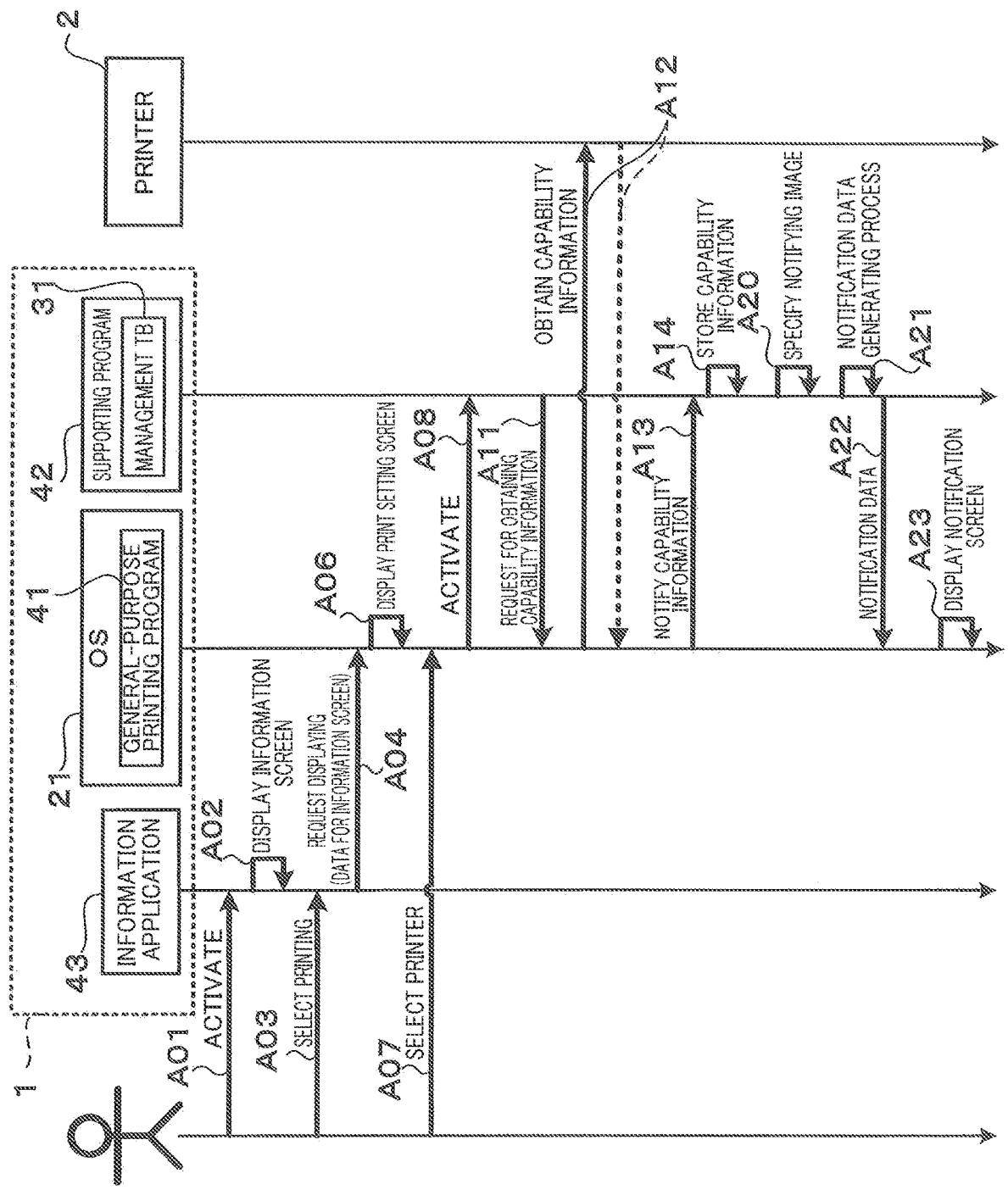
FIG. 3 is a view illustrating an example of a sequence of steps performed in a case where printing is selected.

As illustrated in FIG. 3, at A07, the user can select the printer by performing the operation to the printer selecting column 51 on the print-setting screen D2 which is being displayed. In a case where the selected printer is the printer 2, the general-purpose printing program 41 activates the supporting program 42 corresponding to the printer 2 and transmits a request for a process corresponding to the selection of the printer at A08. At A08, the general-purpose printing program 41 passes, to the supporting program 42, information related to the selected printer and information related to the print settings being set at the time of the selection of the printer 2.

It is noted that, in a case where the printer 2 is set to the printer usually used in the OS 21, for example as illustrated in FIG. 5, the general-purpose printing program 41 displays, at A06, the print-setting screen D2 in a state in which the printer 2 is being selected, and the general-purpose printing program 41 activates the supporting program 42, at A08. That is, the printer 2 is automatically selected by the OS 21, and the general-purpose printing program 41 performs the process of A08 based on the information of the selected printer 2. In this case, the user does not need to perform the operation of A07.

It is noted that the information application 43 may cause the PC 1 to display the print-setting screen D2 on the display 13a instead of displaying the print-setting screen D2 by the general-purpose printing program 41. In this case, the information application 43 activates the general-purpose printing program 41 in response to the selection of printing at A03, obtains data of an image for displaying the image on the print-setting screen D2 from the general-purpose printing program 41, and causes the PC 1 to display the print-setting screen D2 on the display 13a. Then, the information application 43 passes the information related to the selected printer 2 to the general-purpose printing program 41 in accordance with a state in which the printer 2 is being selected or a state in which the printer 2 is selected at A07. As a result of this, the general-purpose printing program 41 activates the supporting program 42 conforming to the printer 2 at A08.

At A11, the supporting program 42 transmits to the OS 21 a request for capability information of the printer 2 in response to the activation of the supporting program 42. The OS 21 transmits an obtaining request for obtaining the capability information to the printer 2 in response to receipt of the request from the supporting program 42, and the OS 21 obtains the capability information from the printer 2 at A12. The OS 21 passes the capability information obtained from the printer 2 to the supporting program 42 at A13.

The OS 21 communicates with the printer 2 over communication in accordance with, for example, the IPP (Internet Printing Protocol). It is noted that the supporting program 42 may directly obtain, from the printer 2, the capability information by using, for example, MIB (Management Information Base), instead of transmitting the request to the OS 21.

The capability information obtained from the printer 2 includes information of parameters settable as the print settings. Moreover, the capability information includes information indicating a combination of proper print settings. The capability information includes, for example, status information, information related to a remaining amount of consumables, information related to trays mounted on the printer 2, sheet information related to sheets set on each of the trays, and information related to applicable printing resolutions. Moreover, the printer 2 may have functions, of printing based on the processed data of images processed based on the received print job, such as a function of page-integrating printing such as N in 1, a function of composite printing such as watermarking and a function of saving printing for saving coloring agents. In a case where there is the function of the image processing executable by the printer 2, the printer 2 may pass the information related to the function, as the capability information, to the OS 21.

At A14, the supporting program 42 stores the capability information notified at A13 from the OS 21 into a predetermined area available to the supporting program 42 in the memory 12. It is noted that, in a case where the capability information has already been stored in the memory 12, the supporting program 42 overwrites the previously stored capability information with the currently obtained capability information.

The supporting program 42 specifies the notifying image based on the obtained capability information at A20. Specifically, in a case where the obtained capability information includes information set to the printer 2, the supporting program 42 verifies the information against the management TB 31. In a case where the information set to the printer 2 includes the parameter set in the management TB 31, the supporting program 42 specifies the notifying image corresponding to the parameter as the notification to be notified to the user.

As illustrated in FIG. 3, at A21, the supporting program 42 executes a notifying data generating process based on the capability information obtained at A13 and the notifying image specified at A20. The notifying data generating process is a process in which notifying data indicating the notifying image which is displayed on the notifying area 52 in the print-setting screen D2 is generated. The notifying image displayed on the notifying area 52 may include, for example, a text, a still picture, or a movie, and the notifying image may include a combination of the text, the still picture and the movie.

Moreover, the supporting program 42, at A22, passes, to the general-purpose printing program 41, display information including information related to print setting values based on the generated notifying data and the capability information. Then, the supporting program 42 ends the process. At A23, the general-purpose printing program 41 causes the PC 1 to display, based on the displaying information received from the supporting program 42, the notifying image on the notifying area 52 in the print-setting screen D2 which is being displayed on the display 13a. At A23, information based on the capability information of the printer 2 is displayed on the print setting column 53 as an initial value of each of the print settings, in addition to the notifying image displayed on the notifying area 52 based on the notifying data. It is noted that, in a case where the information application 43 is configured to display the print-setting screen D2, the information application 43 causes the PC 1 to display, at A23, the notifying image on the notifying area 52 in response to receipt of the notifying data.

It is noted that, in a case where the supporting program 42 receives the print setting set in the print-setting screen D2 from the general-purpose printing program 41 at A08, the supporting program 42 may specify the notifying image by verifying the print setting against the management TB 31 at A20 instead of the capability information, and the supporting program 42 may generate the notification data including the specified notifying image at A21. Then, the supporting program 42 may pass the generated notification data to the general-purpose printing program 41 at A22, and may display the notifying image, which is based on the print setting, on the notifying area 52 at A23.

For example, in a case where "page-layout printing (2 in 1)" is set to the general-purpose printing program 41 when the printer 2 is specified, the supporting program 42 reads the notifying image 201 (see FIG. 2) from the management TB 31, generates the notification data including the notifying image 201, and causes the general-purpose printing program 41 to display the notifying image 201 on the notifying area 52 in the print-setting screen D2.

According to this configuration, the notifying image corresponding to the print setting obtained from the general-purpose printing program 41 is displayed on the notifying area 52 when the printer 2 is selected. Accordingly, the user can directly recognize the configuration image of the printed object in the current setting of the selected the printer 2. It is noted that, in this case, a process at A08 is an example of a setting obtaining process. A process at A20 is an example of a generating process. A process at A22 is an example of a displaying process.

It is noted that, in an example in FIG. 5, the print-setting screen D2 including the single notifying area 52 is described, however, arrangements, shapes, sizes and a number of the notifying areas 52 are not limited to the example in FIG. 5. The supporting program 42 may obtain the information to be displayed on the notifying area 52 from the general-purpose printing program 41, and may determine the notifying data to be displayed on the notifying area 52 based on the obtained information. For example, in a case where there are a plurality of areas each capable of displaying the notifying area 52 and the supporting program 42 can designate any of the plurality of areas each on which the notifying image is displayed, the supporting program 42 may pass, to the general-purpose printing program 41, the notifying data including information designating any of the plurality of areas each on which the notifying image is displayed. Moreover, in a case where a size of the notifying area 52 can be selected, the supporting program 42 may pass information designating the size of the notifying area 52 to the general-purpose printing program 41.

It is noted that the supporting program 42 may display the information by itself instead of generating the notifying data and passing the generated notifying data to the general-purpose printing program 41. In this case, however, another screen is also displayed on the display 13a in addition to the print-setting screen D2. It is possible to reduce the user's stress by displaying said another screen in the print-setting screen D2 of the general-purpose printing program 41 of the OS 21 so as to achieve simple displaying.

Figure 6:
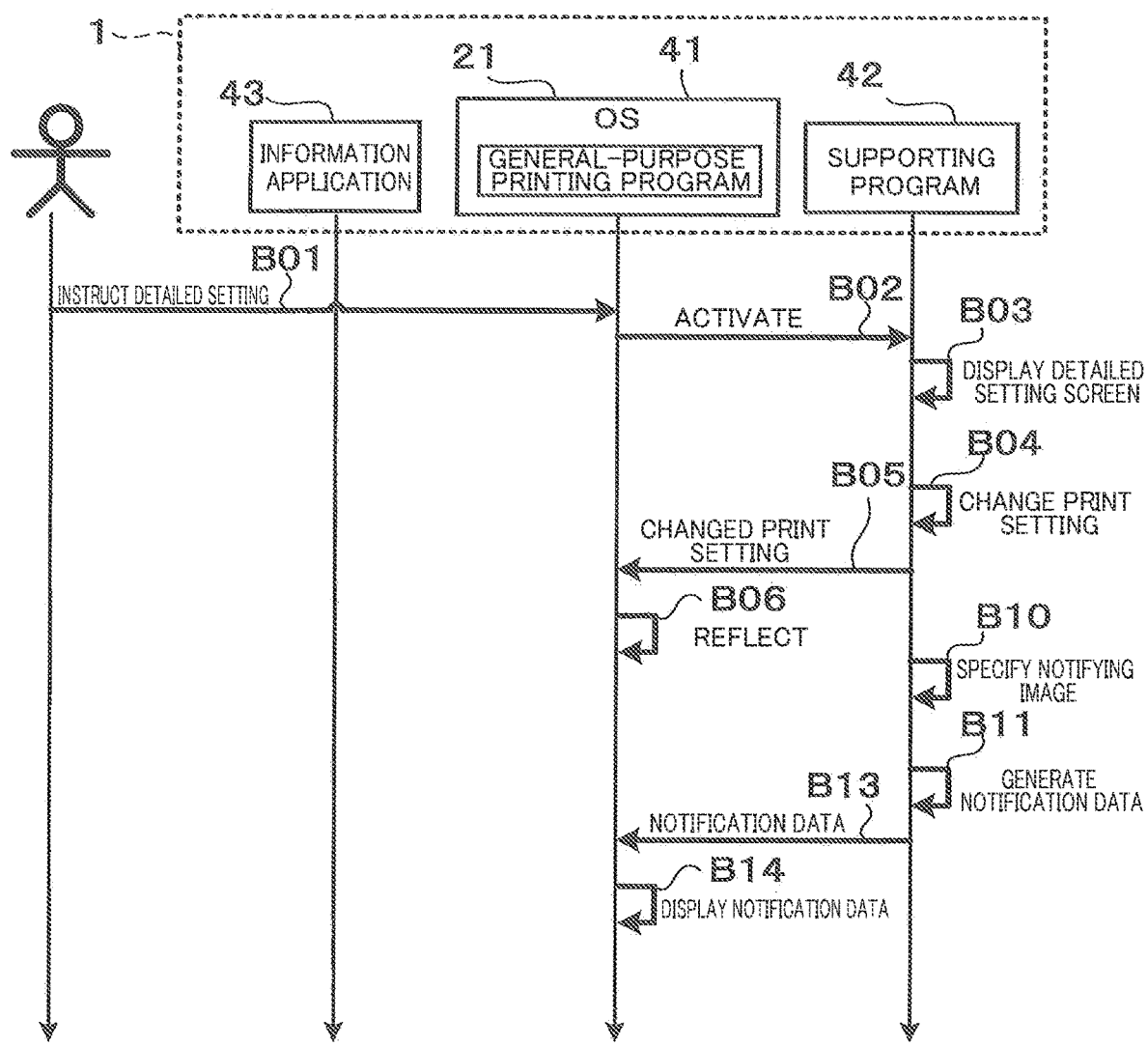
FIG. 6 is a view for explaining an example of a sequence of steps performed in a case where a detailed setting is selected.

There will be next described, with reference to FIG. 6, a sequence of steps of each of the programs performed in a case where an instruction of a detailed setting to the detailed setting button SW2 by an operation of the user is received in a state in which the print-setting screen D2 illustrated in FIG. 5 is displayed.

As illustrated in the sequence in FIG. 6, the general-purpose printing program 41 activates the supporting program 42 at B02 based on the instruction of the detailed setting by the user at B01. The general-purpose printing program 41 passes the print setting set in the print setting column 53 in the print-setting screen D2 to the supporting program 42, and requests a process of receiving the detailed setting.

The supporting program 42 causes the display 13a to display, for example, a detailed setting screen D3 illustrated in FIG. 7. A detailed setting column 61 and an applying button SW22 are displayed on the detailed setting screen D3 at B03. Various kinds of items of the print settings corresponding to the functions which are supported by the supporting program 42 are displayed on the detailed setting column 61. Each of the various kinds of items reflects the print setting received from the general-purpose printing program 41.

In addition to the items which can be set in the print-setting screen D2 (see FIG. 5), the items which cannot be set in the print-setting screen D2 can be set in the detailed setting column 61. Moreover, the items which cannot be set in the printer 2 can be set in the detailed setting column 61. For example, in a case where the poster printing of the processing option cannot be set in the print-setting screen D2 and in the printer 2, the setting of the poster printing can be set in the detailed setting screen D3.

When the supporting program 42 receives an instruction for changing the print setting by the operation of the applying button SW22, the supporting program 42, at B04, changes the print setting received at B02 by using the print setting set in the detailed setting column 61. The supporting program 42 passes the changed print setting to the general-purpose printing program 41 at B05, and ends the processes. The supporting program 42 stores the items which cannot be set in the print-setting screen D2 into a memory area for the supporting program 42. The general-purpose printing program 41 causes the display 13*a* to display the changed print setting received from the supporting program 42 and which can be displayed on the print setting column 53 in the print-setting screen D2 illustrated in FIG. 5 at B06.

The supporting program 42 verifies the changed print setting against the management TB 31, and specifies, at B10, the notifying image to be displayed on the notifying area 52 in the print-setting screen D2 in a case where the notifying image corresponding to the parameter included in the changed print setting is included in the management TB 31. Then, the supporting program 42 generates the notification data including the specified notifying image at B11, and passes the generated notification data to the general-purpose printing program 41 at B13. The general-purpose printing program 41 causes the display 13*a* to display the notifying image of the notification data received from the supporting program 42 on the notifying area 52 in the print-setting screen D2 at B14. Accordingly, the user can recognize the configuration of the printed object, the setting of which cannot be checked by the print-setting screen D2, by the notifying image displayed on the notifying area 52. It is noted that since the processes at B10, B11, B13, B14 are the same as the process at C10, C11, C13, C14, which will be described below, an explanation of the processes at B10, B11, B13, B14 is dispensed with.

Next, there will be described steps of each of the programs performed in a case where an instruction for changing the print setting by operations of the user to the print setting column 53 is received while the print-setting screen D2 illustrated in FIG. 5 is displayed, with reference to a sequence in FIG. 8. It is noted that, as described above, the print-setting screen D2 can receive the instruction for changing the print setting by the operations to the print setting column 53 and an instruction for the print execution by operations to the printing button SW3.

The general-purpose printing program 41 receives the instruction for changing the print setting by the user at C01, and changes a displaying image displayed on the print setting column 53 in the print-setting screen D2 at C02. Further, in a case where the print setting is changed, the general-purpose printing program 41 activates the supporting program 42 and transmits to the printing program 41 a request for performing processes corresponding to the change of the print setting at C03. At C03, the supporting program 42 receives the information of the changed print setting from the general-purpose printing program 41. The process at C03 is an example of a setting obtaining process.

The supporting program 42 causes the print setting stored in the memory area for the supporting program 42 to reflect the changed print setting at C04.

The supporting program 42 specifies the notifying image based on the changed print setting at C10. The supporting program 42 verifies the changed print setting obtained at C03 against the management TB 31. In a case where the notifying image corresponding to the changed print setting is stored in the management TB 31, the supporting program 42 reads the stored notifying image. The notifying image read from the management TB 31 may be one or more images. The supporting program 42 generates the notification data including the specified notifying image at C11. The notification data may include text information which explains a parameter which is set in the changed print setting in addition to the notifying image. The process at C10 and C11 is an example of a generating process.

The supporting program 42 passes the notification data generated at C11 to the general-purpose printing program 41 at C13. At C14, the general-purpose printing program 41 causes the display 13*a* to display the received notification data on the notifying area 52 in the print-setting screen D2 which are displayed by the general-purpose printing program 41. The process at C13 is an example of a displaying process.

There will be described the processes at C10 to C14 with concrete examples. For example, in a case where the setting value of the setting item of "layout" is changed from "standard (1 in 1)" to "page-layout printing (2 in 1)" in the print-setting screen D2 illustrated in FIG. 5, the general-purpose printing program 41 passes the changed print setting to the supporting program 42 at C01, C02 and C03 in FIG. 8. The changed print setting includes the parameters of the unchanged setting item, such as the orientation of printing, in addition to the parameter of the changed setting item.

The supporting program 42 verifies the changed print setting received from the general-purpose printing program 41 against the management TB 31 illustrated in FIG. 2. "Page-layout printing (2 in 1)" included in the changed print setting corresponds to the print setting stored in the management TB 31. The supporting program 42 reads the notifying image 201 associated with "page-layout printing (2 in 1)" (see FIG. 2) from the management TB 31 at C10 in FIG. 8, and the supporting program 42 generates the notification data including the notifying image 201 at C11. Moreover, the supporting program 42 causes the notification data to include text information which explains the parameter corresponding to the notifying image 201. For example, the notification data includes the text information which explains that "page-layout printing (2 in 1)" is set to the setting item "layout".

Figure 8:
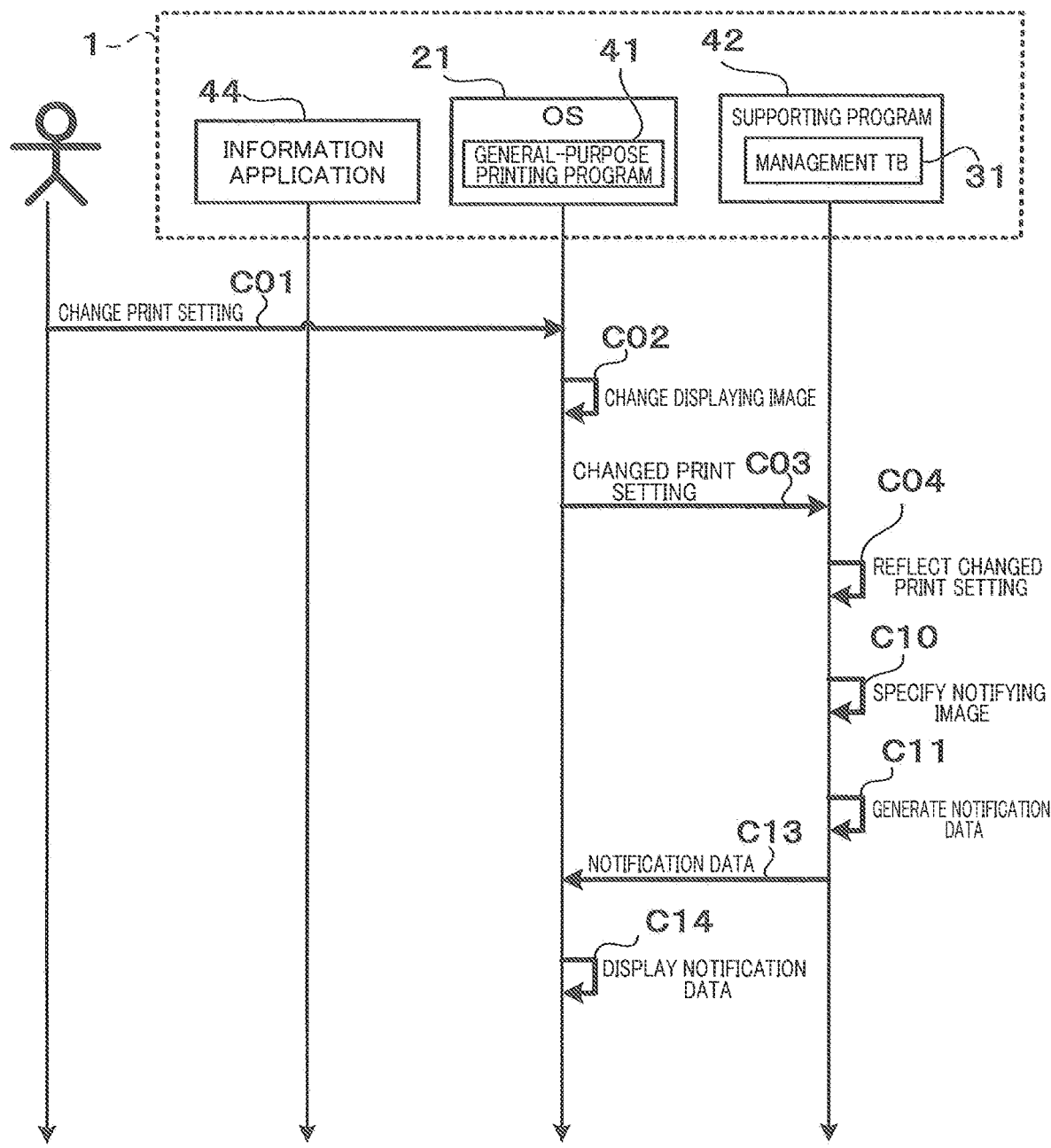
FIG. 8 is a view illustrating an example of a sequence of steps performed in a case where a change of the print setting is received.
Figure 9A:
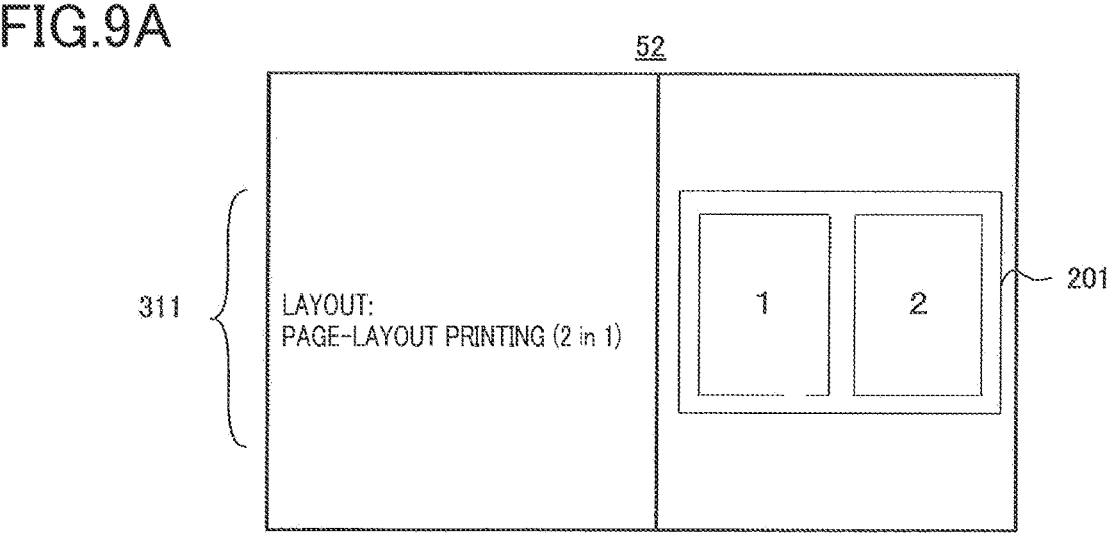
FIG. 9A is a view illustrating an example of a display of notification data.

The supporting program 42 passes the generated notification data to the general-purpose printing program 41 at C13 in FIG. 8. As illustrated in FIG. 9A, at C14, the general-purpose printing program 41 causes the display 13*a* to display, for example, the notifying image 201 and text information 311 included in the notification data generated by the supporting program 42 on the notifying area 52 in the print-setting screen D2 which is displayed by a request from the information application 43. The user can recognize the configuration of the printed object in which the two images of the two pages are arranged in a left and right direction before the execution of printing. Moreover, the user can recognize by the text information 311 that the user can adjust the arrangement of the documents by operating the parameter of "layout".

Moreover, for example, in a case where the setting value of the setting item of "layout" is changed from "standard (1 in 1)" to "page-layout printing (2 in 1)" in the print-setting screen D2 illustrated in FIG. 5 in a state in which "upper-left" is set to the setting item of "stapling", the supporting program 42 reads, at C10, the notifying image 201 associated with "page-layout printing (2 in 1)" and the notifying image 205 associated with "stapling (upper-left)" from the management TB 31 illustrated in FIG. 2 when the supporting program 42 receives the changed print setting from the general-purpose printing program 41 at C01 to C03 in FIG. 8.

The supporting program 42 generates the notification data based on the read notifying image 201 and the read notifying image 205 at C11 in FIG. 8. For example, the supporting program 42 generates a combined image into which the notifying image 201 and the notifying image 205 are combined, and causes the notification data to include the combined image as the notifying image. In this case, the supporting program 42 causes the notification data to include the text information which explains the parameter of "page-layout printing (2 in 1)" corresponding to the notifying image 201 and the parameter of "stapling (upper-left)" corresponding to the notifying image 205.

It is noted that the management TB 31 of the supporting program 42 may store a combined image into which a plurality notifying images respectively corresponding to a plurality of parameters are combined, for example, a combined image 401 in advance. In this case, since the supporting program 42 reads one combined image based on the plurality of parameters from the management TB 31, there is no need to combine the plurality of notifying images into one notifying image. Accordingly, it is possible to reduce the generating time of the notification data.

Figure 9B:
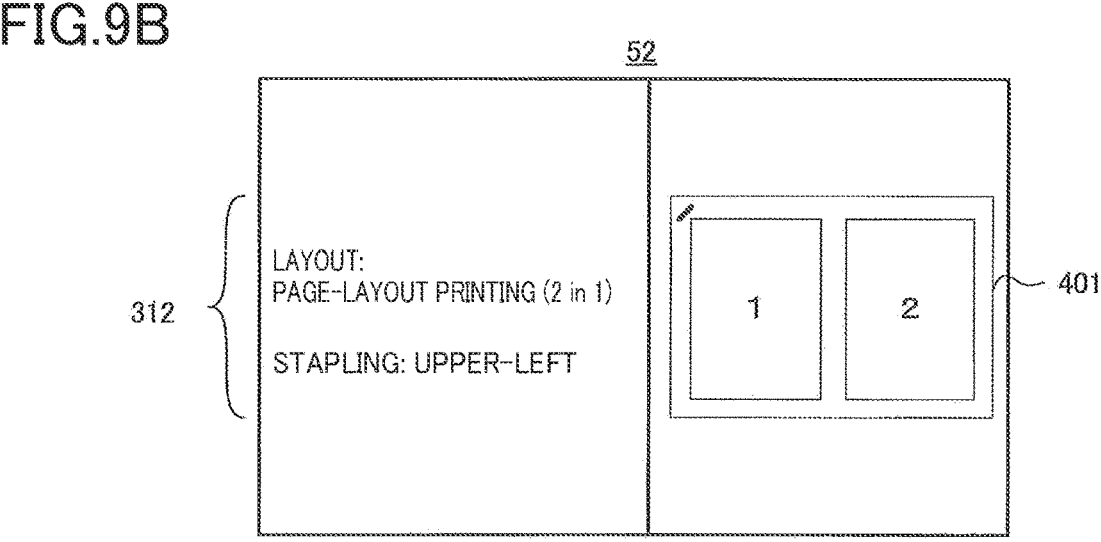
FIG. 9B is a view illustrating an example of the display of the notification data.

The supporting program 42 passes the notification data including the combined image to the general-purpose printing program 41 at C13 in FIG. 8, and causes the general-purpose printing program 41 to display the combined image 401 and text information 312 including in the notification data on the notifying area 52 at C14, as illustrated in FIG. 9B. The user can recognize by the notifying image 401 that the printing sheets printed in the print setting of "page-layout printing (2 in 1)" are stapled with a staple even when, for example, the user changes the setting of "layout" and does not change the setting of "stapling" in the print-setting screen D2. Moreover, the user can recognize by the text information 312 that the user can adjust a position of the staple or setting of using or not using the staple by operating the parameter of "stapling".

Figure 9C:
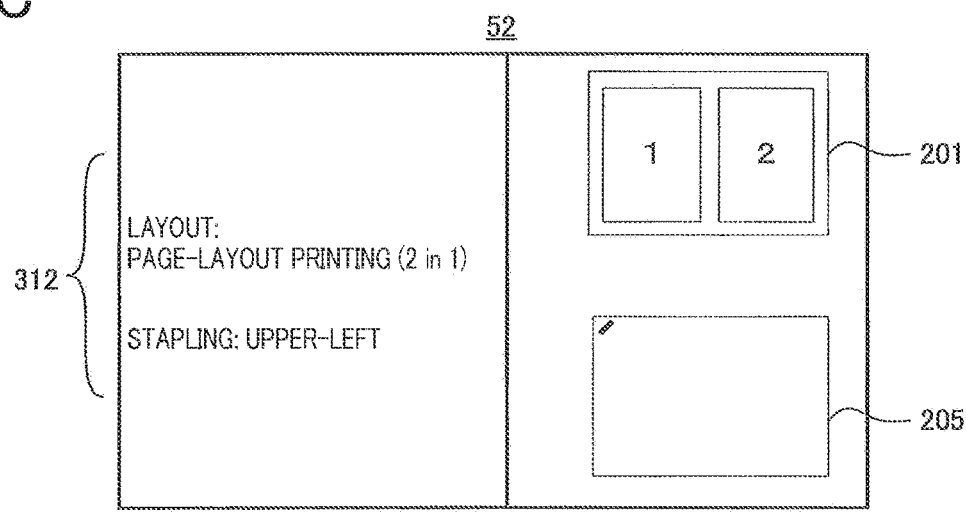
FIG. 9C is a view illustrating an example of the display of the notification data.

It is noted that, in a case where the plurality of notifying images, in this case, the notifying image 201 and the notifying image 205, are specified at C10 in FIG. 8, the supporting program 42 may cause the notification data to include the notifying image 201 and the notifying image 205 in a state in which the supporting program 42 do not process the notifying image 201 and the notifying image 205, and may pass the notification data to the general-purpose printing program 41. That is, the supporting program 42 may not generate the combined image 401. In this case, as illustrated in FIG. 9C, the plurality of notifying images (i.e., the notifying image 201 and the notifying image 205) included in the notification data may be displayed such that the plurality of notifying images are reduced in size, displayed separately and arranged in a row on the notifying area 52 in the print-setting screen D2 which is displayed by the general-purpose printing program 41. It is noted that the plurality of notifying images included in the notification data may be displayed on the notifying area 52 so as to be switched from one notifying image to another at a predetermined interval.

According to this, since the plurality of notifying images are separately displayed on the notifying area 52 without being combined, the user can easily recognize that the configuration of the printed object indicated by the notifying images is formed by the operations of the parameters. In this case, the user can further recognize the relationship between the notifying image and the parameter when the display of the text information 312 is switched from one text information 312 to another in accordance with the switch of the display of the notifying images displayed on the notifying area 52.

It is noted that "page-layout printing (2 in 1)" is an example of a first parameter, and "stapling (upper-left)" is an example of a second parameter. The notifying image 201 is an example of a first notifying image, and the notifying image 205 is an example of a second notifying image.

The supporting program 42 may process the notifying image by processes other than combination of images when the supporting program 42 generates the notification data at C11 in FIG. 8. For example, in a case where the setting of "layout" is changed to "page-layout printing (4 in 1)" in the print-setting screen D2 in FIG. 5, the supporting program 42 receives the generated print setting from the general-purpose printing program 41 at C01 to C03 in FIG. 8, and reads, at C10, the notifying image 202 associated with "page-layout printing (4 in 1)" from the management TB 31 illustrated in FIG. 2.

For example, suppose a situation in which "maximum speed" has been set to "printing quality" when the setting of "layout" is changed. The setting of "maximum speed" is a setting in which reduction of printing time has a high priority than printing beautifully. Density of printing in the setting of "maximum speed" becomes lower than the normal setting. In this case, the supporting program 42 causes the notification data to include information which causes the notifying image 202 to be displayed coarsely and the notifying image 202 read from the management TB 31. It is noted that the supporting program 42 may process the notifying image 202 so as to be displayed coarsely, and may cause the notification data to include the processed notifying image 202. The supporting program 42 may cause the notification data to include text information which explains the parameter "maximum" of "printing quality".

Figure 10A:
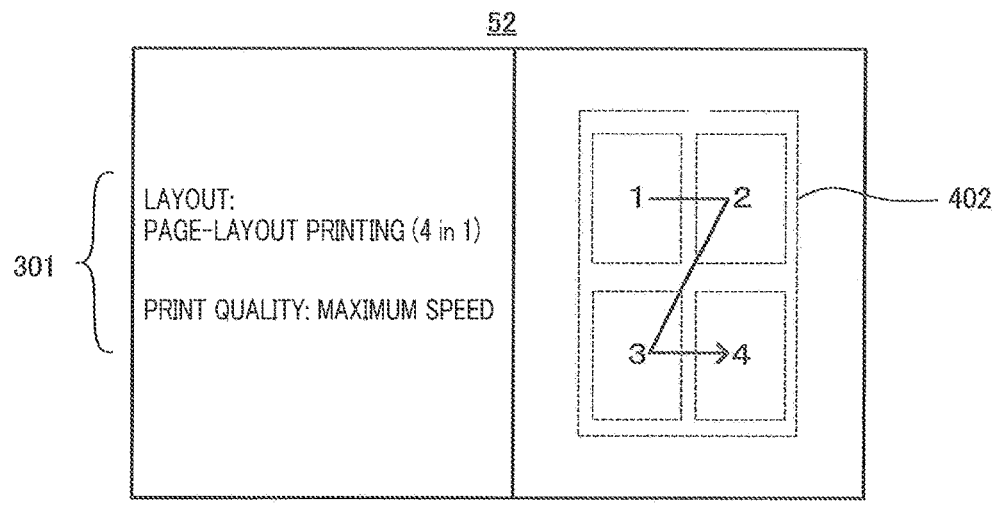
FIG. 10A is a view illustrating an example of the display of the notification data.

The supporting program 42 passes the generated notification data to the general-purpose printing program 41 and causes the general-purpose printing program 41 to display the notification data on the notifying area 52 in the print-setting screen D2 at C13 and C14 in FIG. 8. As illustrated in FIG. 10A, the generated notifying image 402 which is processed from the notifying image 202 such that the notifying image 202 is displayed coarsely as the notifying image is displayed on the notifying area 52. The process may be performed by the general-purpose printing program 41, or the process may be performed by the supporting program 42 at the generating of the notification data. Text information 301 which explains that "maximum speed" is set to "printing quality" is displayed on the notifying area 52. The user can recognize by the notifying image 402 that density of printing in the current print setting of "maximum speed" becomes lower than the normal setting. Moreover, the user can recognize that a cause of reduction of printing in density results from "printing quality".

Figure 10B:
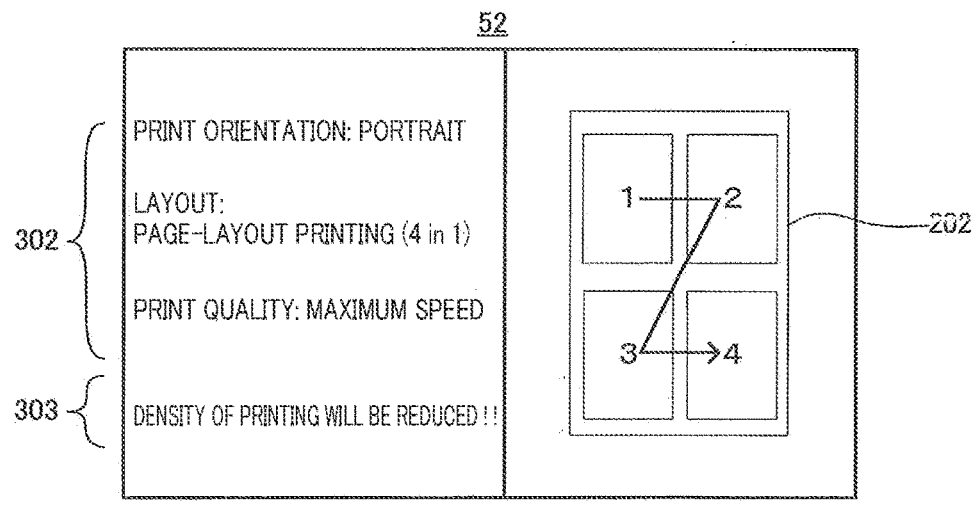
FIG. 10B is a view illustrating an example of the display of the notification data.

It is noted that the supporting program 42 may notify the reduction of printing in density by, for example, as illustrated in FIG. 10B, displaying text information 303 in a state in which the notifying image 202 is normally displayed. According to this, it is possible to reduce image processing by the supporting program 42 and to reduce the generating time of the notification data. "Printing quality" is an example of a particular parameter.

In the meantime, the supporting program 42 may cause the general-purpose printing program 41 to display the notifying image on the notifying area 52 in accordance with the print settings set in the print-setting screen D2 in FIG. 5 even in a case where the supporting program 42 receives the setting in the detailed setting screen D3 in FIG. 7.

For example, in a case where "ON" is set to the setting of the poster printing which corresponds to a function not applicable to the general-purpose printing program 41, the supporting program 42 reads the notifying image 204 associated with the poster printing from the management TB 31, and generates the notification data including the notifying image 204 and text information corresponding to the notifying image 204 at B10 and B11 in FIG. 6. The supporting program 42 passes the generated notification data to the general-purpose printing program 41, and causes the general-purpose printing program 41 to display the notifying image 204 and text information 321 on the notifying area 52 in the print-setting screen D2 displayed by the general-purpose printing program 41. That is, an image indicating how the image is divided is displayed on the notifying area 52.

The user can recognize by the notifying image 204 displayed on the notifying area 52 that the image is printed in the divided manner. Moreover, even in a case where another setting is set in the print setting column 53, the user can steadily recognize, by the notifying image 204 displayed on the notifying area 52, that the image is printed in the divided manner. As a result of this, it is possible to avoid a situation in which a printing result is contrary to the intension of the user.

The supporting program 42 may generate the notification data such that a display color of the notifying image is changed between a case where color printing is set to the changed print setting and a case where monochrome printing is set to the changed print setting. According to this, the user can easily recognize by the display color of the notifying image displayed on the notifying area 52 in the print-setting screen D2 that whether color printing is set to the print setting or not.

Figure 11:
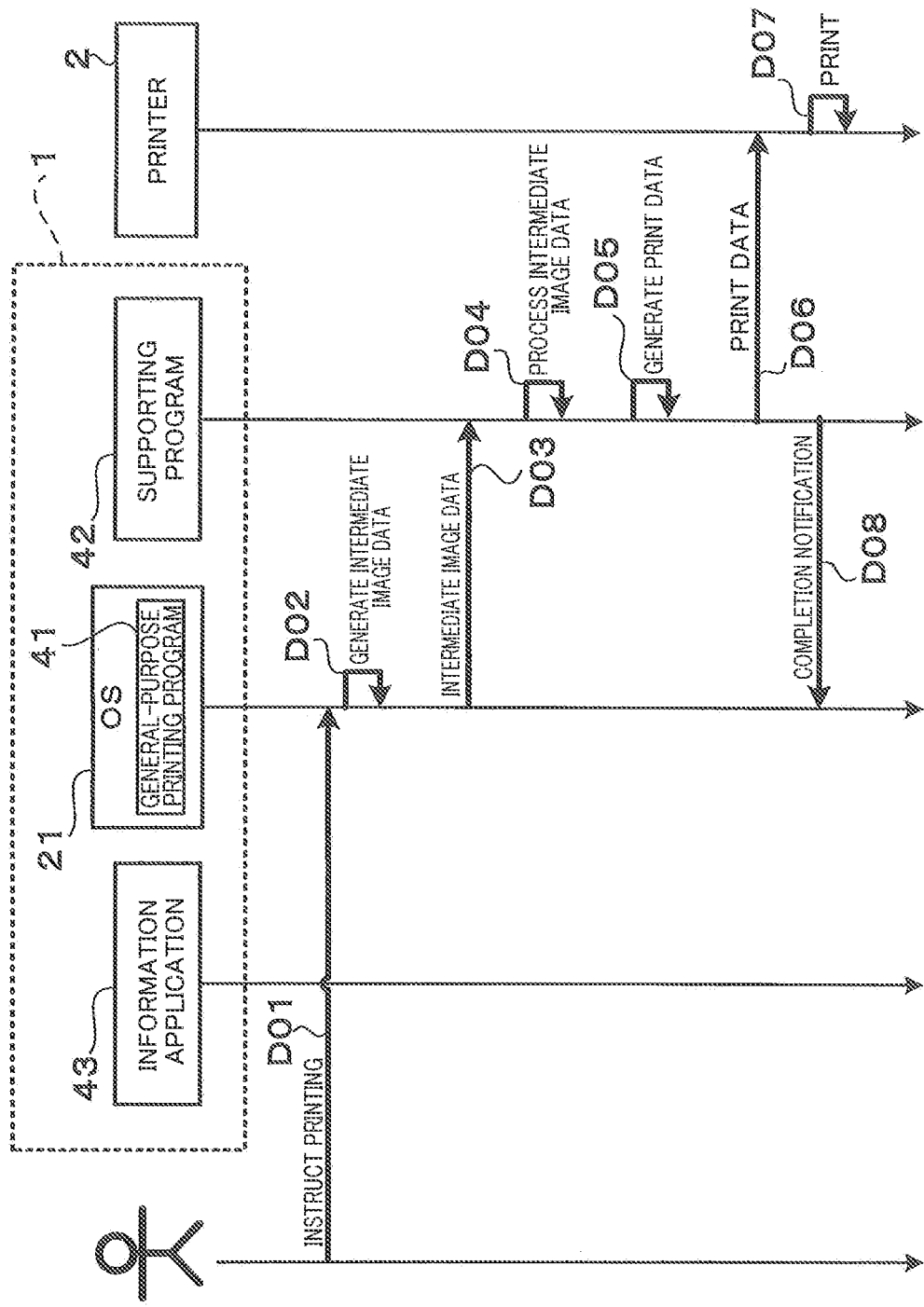
FIG. 11 is a view illustrating an example of a sequence of steps performed in a case where a print instruction is received.

Next, there will be described steps of each of the programs performed in a case where the instruction for the print execution by the operations of the user to the printing button SW3 is received while the print-setting screen D2 illustrated in FIG. 5 is displayed, with reference to a sequence in FIG. 11. It is noted that the instruction for the print execution by the user may be directly inputted to the general-purpose printing program 41. Or, the instruction for the print execution by the user may be inputted to the information application 43 and then the instruction for the print execution may be outputted to the general-purpose printing program 41 from the information application 43.

The general-purpose printing program 41 receives the instruction for the print execution by the user at D01, generates, at D02, the intermediate image data by converting a data format of the image data indicating the image to be displayed to a data format of intermediate image data by using the print setting received in the print setting screen D2, and passes the generated intermediate image data to the supporting program 42 at D03. There are various kinds of formats of the image data included in the information application 43, and the general-purpose printing program 41 converts the image data of the image to be displayed to the intermediate image data suitable for generating the print data. It is noted that, in a case where the image data of the image to be displayed is data suitable for generating the print data, the image data itself may become the intermediate image data without being converted to the intermediate image data. The intermediate image data is, for example, XPS data.

At D04, the supporting program 42 processes the intermediate image data received at D03 such that the change of the print setting reflects. The supporting program 42 executes rasterizing to the processed intermediate image data and generates the print data indicating the image to be displayed at D05. The print data generated at D05 is data having a format usable in printing by the printer 2, for example, PDL data solely dedicated to the model of the printer 2.

Rasterizing by the supporting program 42 conforming to the printer 2 gives the printer 2 a large amount of flexibility and allows the printer 2 to generate the print data suitable for printing by the printer 2 when compared with rasterizing by the general-purpose printing program 41. It is noted that the print data generated by the supporting program 42 may be data having a format usable in printing by printers other than the model of the printer 2.

The supporting program 42 transmits, to the printer 2, the print data generated at D05 together with a printing command for instructing the print execution at D06. The process performed at D06 is an example of a transmitting process. In a case where there is the image processing which is determined to be executed by the printer 2, the supporting program 42 generates the printing command including information of the image processing. Further, the supporting program 42 may notify, at D08, to the general-purpose printing program 41 that the transmission of the print data ends.

When receiving the print data and the printing command, the printer 2 performs printing an image of the print data based on the received printing command at D07. As a result of this, a printed object is generated.

It is noted that the general-purpose printing program 41 may generate the print data instead of the supporting program 42. For example, the supporting program 42 may pass the intermediate image data processed at D03 and the information of the print execution to the general-purpose printing program 41, and the general-purpose printing program 41 may generate the print data by rasterizing the intermediate image data. In this case, the general-purpose printing program 41 passes the generated print data to the supporting program 42. Then, in a case where the supporting program 42 receives the print data from the general-purpose printing program 41, the supporting program 42 transmits, to the printer 2, the print data received from the general-purpose printing program 41 together with the printing command for instructing the print execution.

The print data generated by the general-purpose printing program 41 is print data having a format usable in printing by various kinds of printers, for example, PWGRaster data or PDF data. Rasterizing by the general-purpose printing program 41 allows the supporting program 42 to reduce an amount of processing. As a result of this, it is possible to reduce the processing time by the supporting program 42 and reduce the program size of the supporting program 42.

It is noted that the general-purpose printing program 41 may transmit the print data and the printing command to the printer 2. That is, the supporting program 42 may pass the generated print data to the general-purpose printing program 41 such that the print data is transmitted from the PC 1 to the printer 2 as the destination. In this case, the general-purpose printing program 41 transmits the print data received from the supporting program 42 and so on to the printer 2. In this case, the process in which the supporting program 42 passes the print data to the general-purpose printing program 41 and so on is an example of the transmitting process.

As described above, in the PC 1 on which the supporting program 42 is installed, in a case where the print setting is changed in the print-setting screen D2 displayed by the general-purpose printing program 41, the supporting program 42 obtains the changed print setting and generates the notification data including the notifying image indicating the configuration image of the printed object based on the changed print setting. The supporting program 42 passes the generated notification data to the general-purpose printing program 41 and causes the general-purpose printing program 41 to display the notifying image on the notifying area 52 in the print-setting screen D2. As a result of this, in the PC 1 using the general-purpose printing program 41 of the OS 21, it is possible to notify the configuration image of the printed object. As a result, the user can recognize the layout and so on of the images in the printed object before the execution of the print instruction by the user. Accordingly, it is possible to avoid the situation in which the printing result is contrary to the intension of the user.

It is noted that the embodiments disclosed in the present disclosure are merely described by way of examples, and do not limit the present disclosure. Accordingly, the technical features disclosed in the present disclosure may be embodied with various changes and modifications, which may occur to those skilled in the art, without departing from the spirit and scope of the disclosure. For example, the device connected on the PC 1 is not limited to the printer 2, and may be an apparatus having a printing function such as a multi-function peripheral, a copying apparatus, a facsimile apparatus. Moreover, a number of printers connected to the PC 1 is not limited to the example illustrated in drawings, may be two or more.

Figure 12:
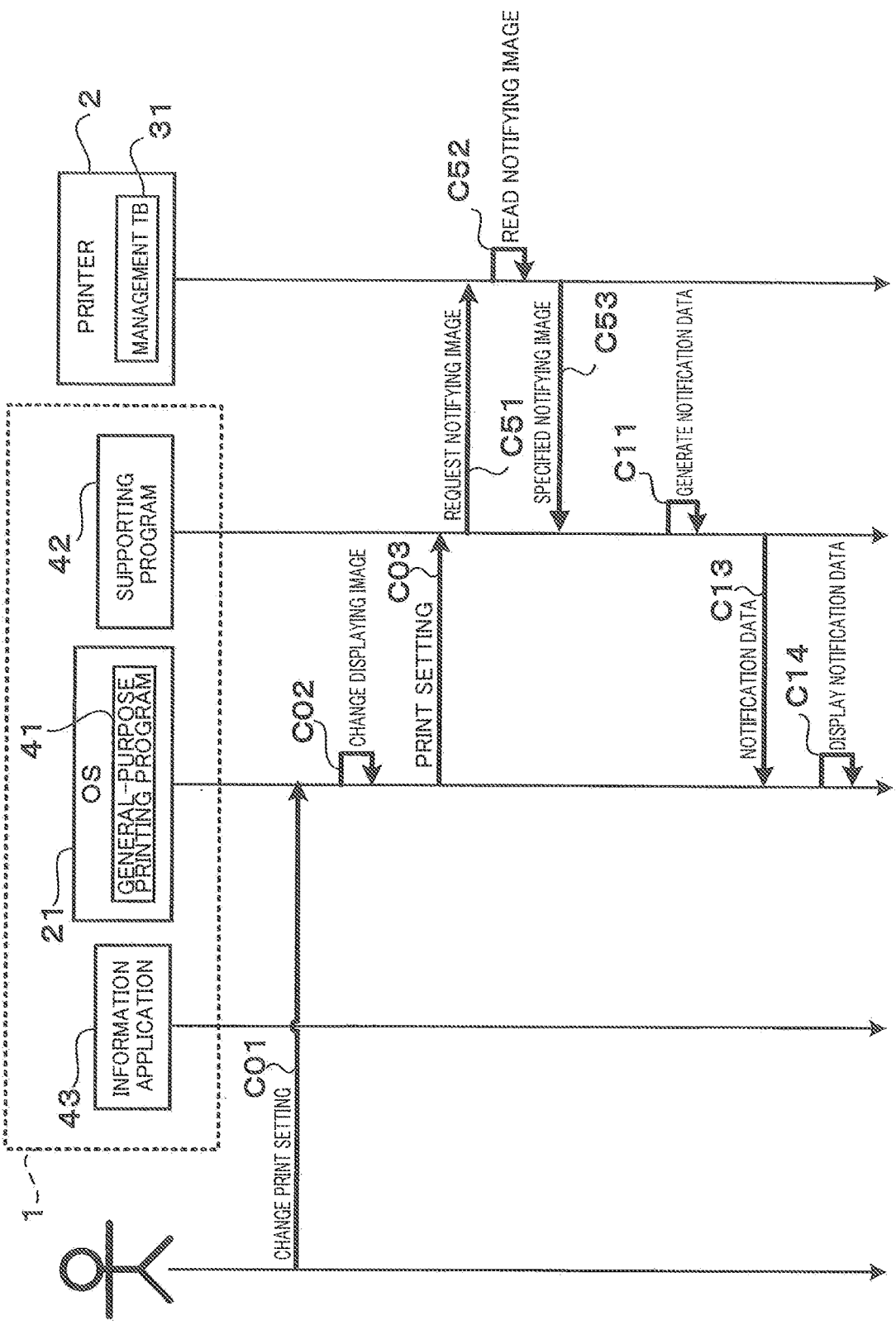
FIG. 12 is a view illustrating a modification of a sequence of steps in the case where the change of the print setting is received.

For example, in the above described embodiment, the management TB 31 is included in the supporting program 42 (see FIG. 1, FIG. 3 and FIG. 8), however, as illustrated in FIG. 12, the management TB 31 may be included in the printer 2. The printer 2 is an example of an external device.

As illustrated in FIG. 12, the supporting program 42 makes a request to the printer 2 for transmitting the notifying image at C51. At this time, the supporting program 42 transmits the print setting received from the general-purpose printing program 41 to the printer 2. The printer 2 specifies the notifying image at C52 by verifying the print setting received from the supporting program 42 against the management TB 31, and transmits the specified notifying image to the supporting program 42 at C53. The supporting program 42 generates the notification data including the notifying image received from the printer 2 at C11, passes the generated notification data to the general-purpose printing program 41 at C13, and causes the general-purpose printing program 41 to display the notification data on the notifying area 52 in the print-setting screen D2 at C14.

As described above, since the supporting program 42 obtains the notifying image from the printer 2, it is possible to reduce a size of the supporting program 42 when compared with the case where the supporting program 42 includes the management TB 31 and stores the notifying image. Moreover, there is no need to change the supporting program 42 when the notifying image needs to be changed. An external device including the notifying image may be a server of a manufacturer of the printer 2 in addition to the printer 2. However, as the above described embodiment, since the supporting program 42 includes the management TB 31 itself, and stores the notifying image, it is possible to generate the notification data including the notifying image quickly when compared with the configuration in which the supporting program 42 obtains the notifying image from an external device.

Figure 10C:
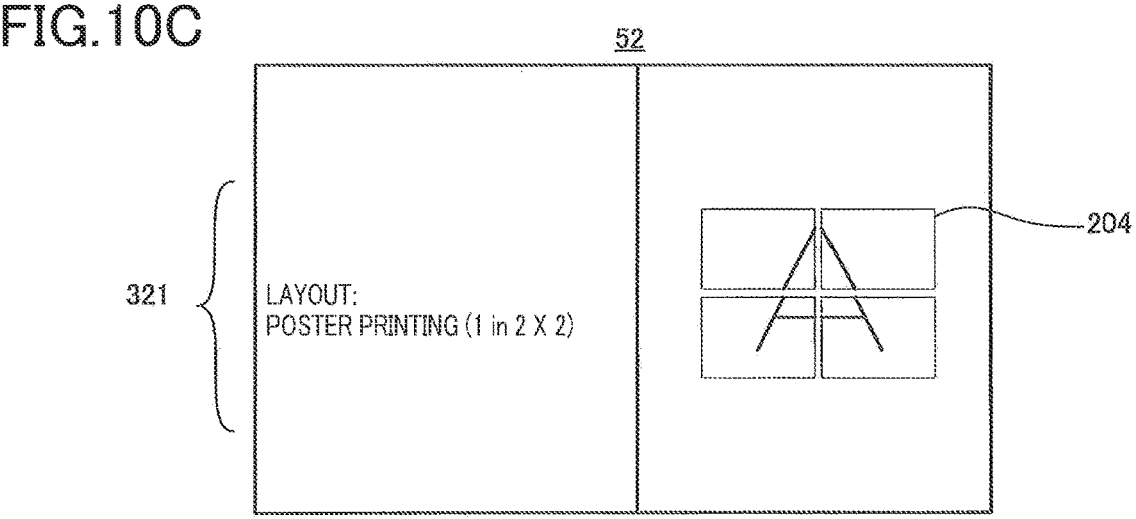
FIG. 10C is a view illustrating an example of the display of the notification data.

Moreover, for example, the notifying images illustrated in FIG. 9 to FIG. 10 are example, and the notifying images are not limited to the examples illustrated in the drawings. For example, the supporting program 42 may generate the notification data not including text information. That is, the text information 311, 312, 301, 302, 303, 321 may not be displayed on the notifying area 52. In this case, the supporting program 42 generates the notification data including the text information explaining the parameter corresponding to the notifying image, and the notifying image is displayed on the notifying area 52. Accordingly, it is possible for the user to easily recognize the parameter by which the notifying image is affected.

Moreover, for example, each of the print setting screen D2 illustrated in FIG. 5 and the detailed setting screen D3 illustrated in FIG. 7 is an example, and the present disclosure is not limited to the illustrated examples.

Moreover, the general-purpose printing program 41 may activate the supporting program 42 in a case where the printer usually used in the OS 21 is switched from another printer to the printer 2 by operations of the user via the OS 21 after the print-setting screen D2 is displayed by the general-purpose printing program 41. In this case, the supporting program 42 may execute the notifying data generating process and may pass the notifying data to the general-purpose printing program 41, in the same manner as the case in which the printer 2 is selected.

Moreover, in the present embodiment, as the operations of the supporting program 42, only printing operations are described in detail, however, the supporting program 42 may have other functions. Moreover, the program executing the processes of the present embodiment is not limited to the supporting program 42, and the program may be a program that receives an instruction from the OS 21 or the general-purpose printing program 41 when executing printing by using the general-purpose printing program 41. For example, the program may be a printing workflow application what is called Print Workflow, the specification of which is published by Microsoft.

Moreover, the execution timing of the supporting program 42 is not limited to the example of the present embodiment. For example, the supporting program 42 may be executed by a direct instruction for executing from the OS 21, or the supporting program 42 may be a resident program. In a case the supporting program is the resident program, the supporting program 42 may perform the above described operations when receiving an execution command.

Moreover, in the any flowcharts disclosed in the present embodiment, the execution order of the plurality of processes in the plurality of any steps may be changed or the plurality of processes may be executed in parallel, without causing a contradiction of the processes.

Moreover, the processes disclosed in the present embodiment may be executed by hardware such as a single CPU, a plurality of CPUs, an ASIC, and a combination of the CPU, the plurality of CPUs and the ASIC. Moreover, the processes disclosed in the present embodiment may be embodied by various kinds of embodiments such as a storage medium storing a program executing the processes, an apparatus including the storage medium and methods.

What is claimed is:

1. A non-transitory storage medium storing a supporting program executable by a computer of an information processing apparatus, wherein the supporting program is configured to support a printing program of an operating system of the information processing apparatus, and the supporting program conforms to an external device connected to the information processing apparatus, wherein the printing program of the operating system is configured to process data so as to display a print setting screen on a display of the information processing apparatus, and wherein the supporting program, when executed by the computer, causes the information processing apparatus to execute when being requested from the printing program of the operating system for processing in response to a change of a print setting, obtaining the print setting, generating, based on the obtained print setting, notification data including a notifying image indicating a configurational image of a printed object, and displaying the notifying image on the print setting screen displayed on the display of the information processing apparatus, before receiving an intermediate image data, by outputting the generated notification data to the printing program of the operating system.

2. The non-transitory storage medium according to claim 1, wherein the notifying image corresponding to the print setting is stored in the supporting program, and wherein, in the generating, the notifying image corresponding to the obtained print setting is specified and the notification data including the specified notifying image is generated.

3. The non-transitory storage medium according to claim 1, wherein, in the generating, a transmission request for the notifying image corresponding to the obtained print setting is outputted to the external device, the notifying image transmitted from the external device based on the output of the transmission request is received, and the notification data including the received notifying image is generated, and wherein a plurality of notifying images respectively corresponding to a plurality of print settings are stored in the external device and, when the transmission request is received by the external device, the notifying image, of the plurality of notifying images, corresponding to the printing setting, of the plurality of print settings, designated by the transmission request is transmitted from the external device to the requester of the transmission request.

4. The non-transitory storage medium according to claim 1, wherein, in the generating, in a case where the obtained printing setting corresponds to a page-integrating-printing setting in which a N number of images of a N number of pages are integrated into and printed on one sheet, the notification data including the notifying image including information indicating the N number of images of the N number of pages that are arranged on the one sheet and a page order of the N number of images is generated, the N being a plural number.

5. The non-transitory storage medium according to claim 1, wherein, in the generating, in a case where the obtained printing setting corresponds to a divided-printing setting in which an image of one page is divided into a M number of sheets, the notification data including the notifying image including information indicating the image of the one page that are divided into the M number of pieces of the image and borders of the M number of pieces of the image, the M number being a plural number.

6. The non-transitory storage medium according to claim 1, wherein, in the generating, in a case where the obtained print setting corresponds to a first parameter and a second parameter and there are a first image corresponding to the first parameter and a second image corresponding to the second image, the notification data including a combined image, as the notifying image, combined of the first image and the second image is generated.

7. The non-transitory storage medium according to claim 1, wherein, in the generating, in a case where the obtained print setting corresponds to a first parameter and a second parameter and there are a first image corresponding to the first parameter and a second image corresponding to the second parameter, the notification data that includes a first notifying image and a second notifying image and that causes the display of the information processing apparatus to display the first notifying image and the second notifying image separately on the print setting screen is generated.

8. The non-transitory storage medium according to claim 1, wherein, in the generating, in a case where the obtained print setting corresponds to a particular parameter, the notification data including the notifying image indicating a configurational image of a printed object corresponding to the particular parameter and text information explaining the particular parameter is generated.

9. The non-transitory storage medium according to claim 1, wherein, when executed by the computer, the supporting program further causes the information processing apparatus to execute the obtaining, the generating and the displaying when being requested from the printing program of the operating system for processing in response to selection of the external device.

10. The non-transitory storage medium according to claim 1, wherein, when being requested from the printing program of the operating system for processing in response to receipt of an instruction for a print execution, outputted from an application program installed on the information processing apparatus to the printing program of the operating system, for causing the external device to print an image, the supporting program causes the information processing apparatus to obtain image data indicating the notifying image from the printing program of the operating system and transmit a printing command to the external device based on the obtained image data.

11. The non-transitory storage medium according to claim 1, wherein the external device is a printer or a server of a manufacture of the printer.

12. A non-transitory storage medium storing a supporting program executable by a computer of an information processing apparatus, wherein the supporting program is configured to support a printing program of an operating system of the information processing apparatus, and the supporting program conforms to an external printer connected to the information processing apparatus, wherein the printing program of the operating system is configured to process data so as to display a print setting screen on a display of the information processing apparatus, wherein the supporting program, when executed by the computer, causes the information processing apparatus to execute when being requested from the printing program of the operating system for processing in response to a change of a print setting, obtaining the print setting, generating, based on the obtained print setting, notification data including a notifying image indicating a configurational image of a printed object, and displaying the notifying image on the print setting screen displayed on the display of the information processing apparatus by outputting the generated notification data to the printing program of the operating system, wherein, in the generating, a transmission request for the notifying image corresponding to the obtained print setting is outputted to the external printer, the notifying image transmitted from the external printer based on the output of the transmission request is received, and the notification data including the received notifying image is generated, and wherein a plurality of notifying images respectively corresponding to a plurality of print settings are stored in the external printer and, when the transmission request is received by the external printer, the notifying image, of the plurality of notifying images, corresponding to the printing setting, of the plurality of print settings, designated by the transmission request is transmitted from the external printer to the requester of the transmission request.

* * * * *